US006588140B1

(12) United States Patent
Johnson et al.

(10) Patent No.: US 6,588,140 B1
(45) Date of Patent: *Jul. 8, 2003

(54) PEST CONTROL SYSTEM

(75) Inventors: Roger D. Johnson, Richfield, MN (US); Thomas T. Danley, Apple Valley, MN (US)

(73) Assignee: Rupp Industries, Inc., Burnsville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/971,304

(22) Filed: Oct. 4, 2001

Related U.S. Application Data

(63) Continuation-in-part of application No. 09/664,274, filed on Sep. 18, 2000, which is a continuation-in-part of application No. 09/395,125, filed on Sep. 14, 1999, now Pat. No. 6,141,901.

(51) Int. Cl.$^7$ ............................................... A01M 1/20
(52) U.S. Cl. ....................................... 43/124; 43/132.1
(58) Field of Search ...................... 43/124, 130, 132.1, 43/144

(56) References Cited

U.S. PATENT DOCUMENTS

| | | |
|---|---|---|
| 1,817,535 A | 8/1931 | Spanel |
| 2,469,963 A | 5/1949 | Grosjean et al. |
| 3,124,893 A | 3/1964 | Glenn |
| 3,782,026 A | 1/1974 | Bridges et al. |
| 4,637,161 A | 1/1987 | Turner |
| 4,640,044 A | 2/1987 | Varnon |
| 4,716,676 A | 1/1988 | Imagawa |
| 4,817,329 A | 4/1989 | Forbes |
| 4,953,320 A | 9/1990 | Nelson |
| 4,958,456 A | 9/1990 | Chaudoin et al. |
| 4,961,283 A | 10/1990 | Forbes |
| 5,058,313 A | 10/1991 | Tallon |
| 5,099,598 A | 3/1992 | Carter |
| 5,203,108 A | 4/1993 | Washburn, Jr. |
| 5,349,778 A | 9/1994 | Chu |
| 5,442,876 A | 8/1995 | Pedersen |
| 5,678,352 A | 10/1997 | Leitner et al. |
| 5,792,419 A | 8/1998 | Williamson et al. |
| 6,141,901 A | 11/2000 | Johnson et al. |
| 6,146,600 A | 11/2000 | Williamson |

*Primary Examiner*—Kurt Rowan
(74) *Attorney, Agent, or Firm*—Haugen Law Firm PLLP

(57) ABSTRACT

A method of pest control which includes forming an enclosure of flexible heat resistant flexible material or fabric about articles forming a working load and heating atmosphere of the enclosure to a temperature which is lethal for the pest being exterminated, and maintaining this elevated temperature in the loaded enclosure for a period sufficient to bring complete working charge to a lethal temperature of 130° F. and maintaining this temperature for at least ten minutes. The treatment is undertaken after determining the air penetration parameters for the enclosure, so as to be able to determine the CFM requirements for achieving an air flow rate of between 10 and 50 air changes per hour in the enclosure, and preferably between 30 and 50 air changes per hour. Heated outside air is introduced to the enclosure at a temperature of at least 200° F., with the temperature in the enclosure being safely elevated until the air temperature reaches the lethal level. A temperature-sensing device may be operably coupled to a heater control, which in turn permits control of the heater/blower system, the sensing device being positioned in the enclosure such that articles comprising the working load in the enclosure attain a lethal temperature.

4 Claims, 4 Drawing Sheets

PEST CONTROL SYSTEM

CROSS-REFERENCE TO RELATED APPLICATIONS

Figure 1:
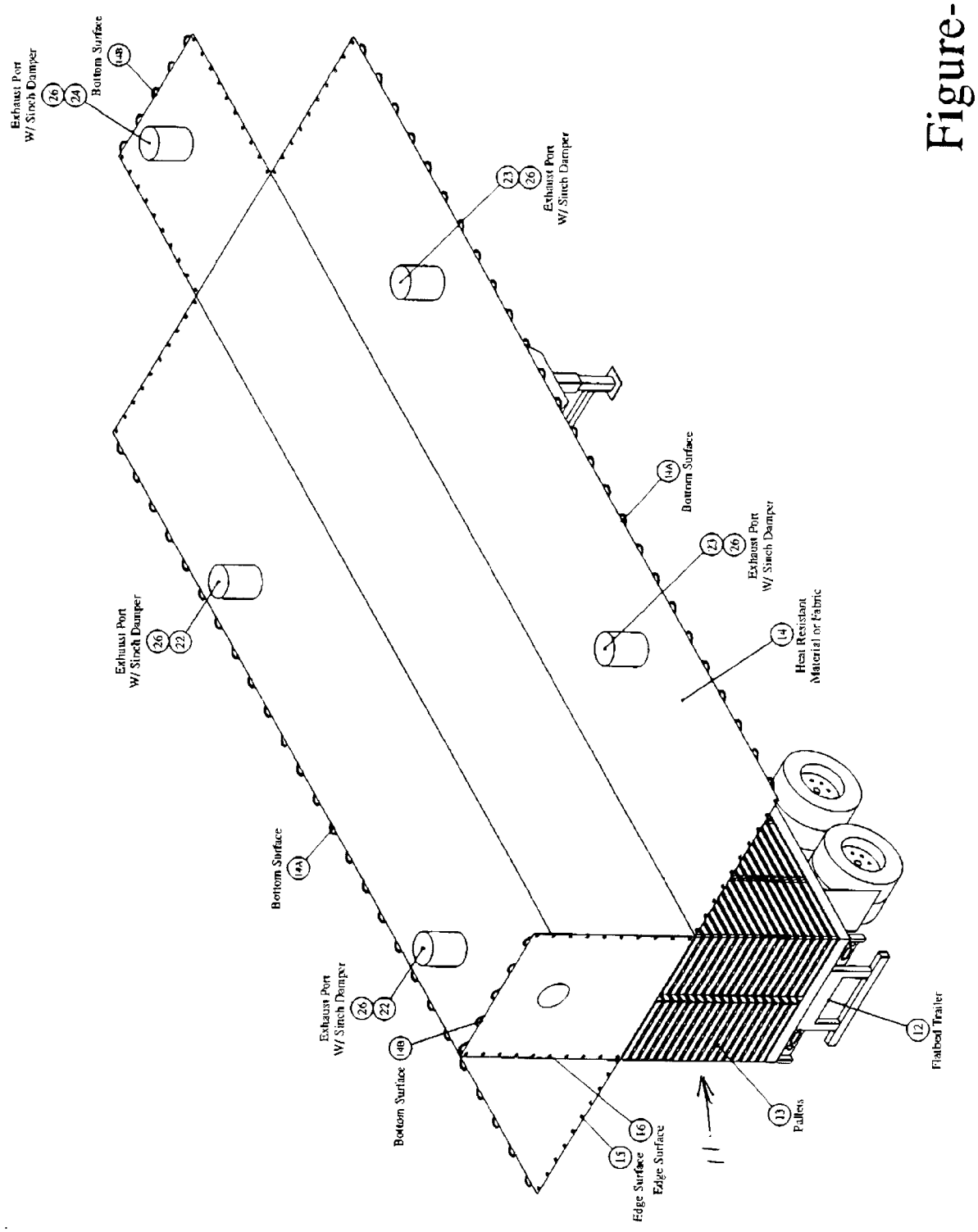

The present application is a continuation-in-part of application Ser. No. 09/664,274, filed Sep. 18, 2000, which was a continuation-in-part of application Ser. No. 09/395,125, filed Sep. 14, 1999, now U.S. Pat. No. 6,141,901, issued Nov. 7, 2000, both being herein incorporated by reference.

BACKGROUND OF THE INVENTION

The present invention relates generally to a method for exterminating pests by thermal treatment of articles which may harbor or provide host opportunities to pests and/or insects, wherein the treatment includes forming a flexible film enclosure about the articles in which the articles undergo exposure to a flow of heated outside air under controlled and isolated conditions. Exposure continues for a period of time sufficient to eradicate or exterminate the pests. The term "pests" is intended to refer generally to creatures such as insects, mammals, reptiles, and the like, but may also include some other undesirable but non-toxic forms of matter such as certain types of bacteria, molds, and viruses.

In the past, various techniques have been employed to exterminate pests, including the exposure to toxic or lethal gases, such as those used in typical fumigation techniques including methyl bromide, dibromobenzene, phosphine, or the like. These techniques involve certain risks to personnel, as well as to the environment, and hence are not readily undertaken without necessary precautions. Some are environmentally unfriendly. On the other hand, the present invention involves a technique for treating the affected articles thermally, with this technique being effective while creating little if any danger to the ambient atmosphere or the environment. Delays resulting from extended periods of post-treatment venting as required with chemical fumigants are also avoided.

As the volume of commerce between individual nations increases, the risk of introduction of new, aboriginal, and/or undesirable pests to the importing nation becomes greater. Introduction of such pests to a nation may occur when the environment of the importing nation lacks a natural enemy for the introduced pest. Accordingly, restrictive regulations are in place in and among trading nations which require proof of pest eradication treatment for the articles being imported, including the actual products as well as auxiliary items such as cargo containers, pallets, and the like. These restrictive regulations make good sense for the importing nation, and strict adherence is, of course, both appropriate and necessary.

In the past it has been common practice to employ certain chemicals and/or fumigants in pest eradication and/or extermination operations. However, because of the adverse affects of popular and traditional fumigants upon humans and the environment, various agencies including environmental protection and pollution control agencies have mandated bans upon use of a number of popular and traditional fumigants. While thermal treatment has been utilized and found to be generally acceptable, traditional thermal treatment operations have proven to be costly, burdensome, and time consuming, and hence are only undertaken with added cost to the seller and/or buyer. The process of the present invention facilitates and expedites thermal treatment of articles so as to substantially reduce the time required for treatment, with a corresponding reduction in cost.

Present thermal treatment operations generally employ a rigid walled chamber, such as a room, compartment or conventional shipping container, the chamber being equipped with a source of heated air, along with one or more exhaust or vent ports. In use, the articles to be treated are introduced into the container, subjected to a thermal treatment cycle, permitted to cool, and thereafter unloaded from the treatment chamber. In accordance with the present invention, however, a thermal treatment process facilitates and expedites portable, rapid and effective thermal eradication and extermination operations.

In preparing articles for processing, the articles to undergo treatment are identified, gathered, and isolated. Articles to be treated are typically, but not always, in the process of being transported from one locale to a new locale, and hence are frequently loaded on pallets, with the pallets, in turn, being loaded upon a transport vehicle such as a flatbed. Due to its portability, the process of the present invention is uniquely adapted for implementation while the articles or objects undergoing the treatment process are permitted to remain on the transport vehicle. In other words, due to the portability of the treatment chamber, it is not necessary to unload or specially stack the articles prior to exposure to the treatment process, thereby substantially reducing the handling steps which would otherwise be necessary. The process of the present invention, utilizing its portability feature, may be employed for treatment of stationary articles such as, for example, food processing equipment. Depending upon the nature of the equipment and/or its ultimate application, it is common practice to treat such equipment periodically so as to eliminate the presence of any pests which the equipment may harbor. The portability feature of the process permits the virtual enveloping of the equipment within a chamber created from flexible heat resistant material such as film or woven cloth, and through which the air heated pursuant to the process of the present invention is passed.

SUMMARY OF THE INVENTION

Thus, in accordance with the present invention, a gas impermeable flexible film is employed to create an enclosure which envelops the articles being treated, i.e. the "working charge". The enclosure is then sealed so as to fully envelop and effectively isolate the working charge. A source of thermal energy is coupled to the enclosure for delivery of a flow of heated air into the enclosure. One or more exhaust vents, as required for the application, are provided in order to move a significant flow of heated air through the film enclosure. The flow of thermal energy is controlled so as to provide an appropriate ramp-up rate followed by a flow to maintain an elevated temperature under steady-state conditions, and thereafter maintaining a flow of ambient air through the enclosure to accomplish cool-down. In order to appropriately monitor the conditions within the enclosure, a number of temperature sensors are placed throughout the enclosure so as to enable the technicians to verify the temperature and thermal conditions throughout the enclosure. Additionally, devices may be provided so as to measure flow rates of air in order to assist in the monitoring.

The gas impermeable flexible film is sealed by means of hook-and-loop fasteners, ratchet tie-downs, and/or other mechanical fasteners such as grommets or other means in order to limit the flow of air through the seam.

The technique of the present invention is adaptable for use in a wide variety of situations. This includes treatment of products which are stacked, situated on shipping pallets, as well as pallets per se, and stationary processing equipment, particularly food processing equipment. The requirements for the articles undergoing or requiring treatment pose few problems or limitations. While it is appropriate that the heat generating equipment be properly sized for the application, the process may be undertaken utilizing conventional fuels including natural gas, propane, steam, electricity, or combinations thereof.

Therefore, it is a primary object of the present invention to provide an improved method, apparatus and system for exterminating pests by thermal treatment of articles which may harbor or provide host opportunities to pests and/or insects, the treatment including formation of a flexible enclosure of heat resistant material about the articles, and thereafter exposing the articles within the enclosure to a flow of heated outside air under controlled and isolated conditions.

It is a further object of the present invention to provide an improved thermal treatment for pest-harboring articles wherein an inflatable enclosure is created about a group of articles to be treated, and thereafter causing a flow of heated air to pass through the enclosure, with the temperature within the enclosure being continuously monitored in accordance with a predetermined thermal cycle.

Other and further objects of the present invention will become apparent to those skilled in the art upon a study of the following specification, appended claims, and accompanying drawings.

IN THE DRAWINGS

Figure 2:
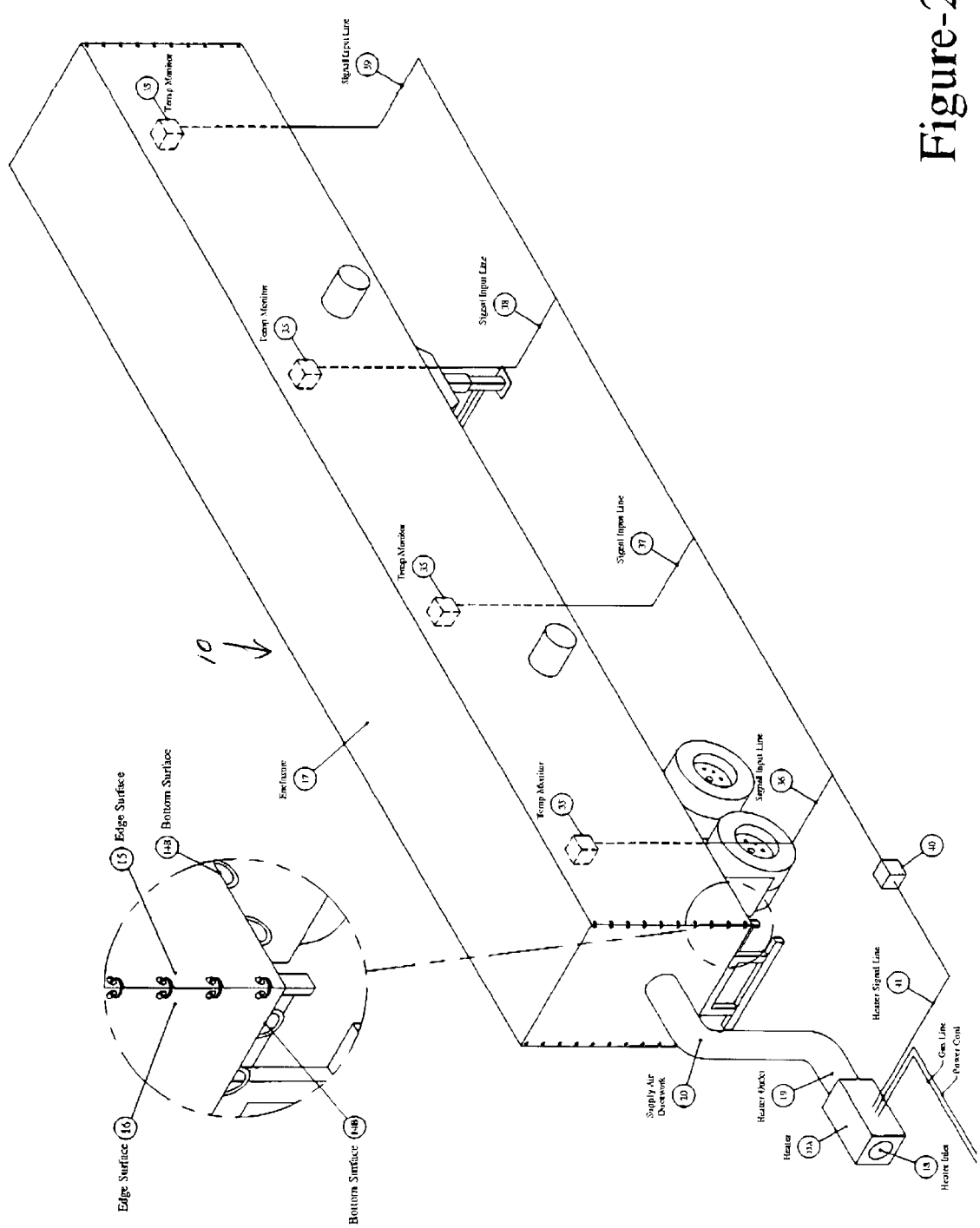
Figure 3:
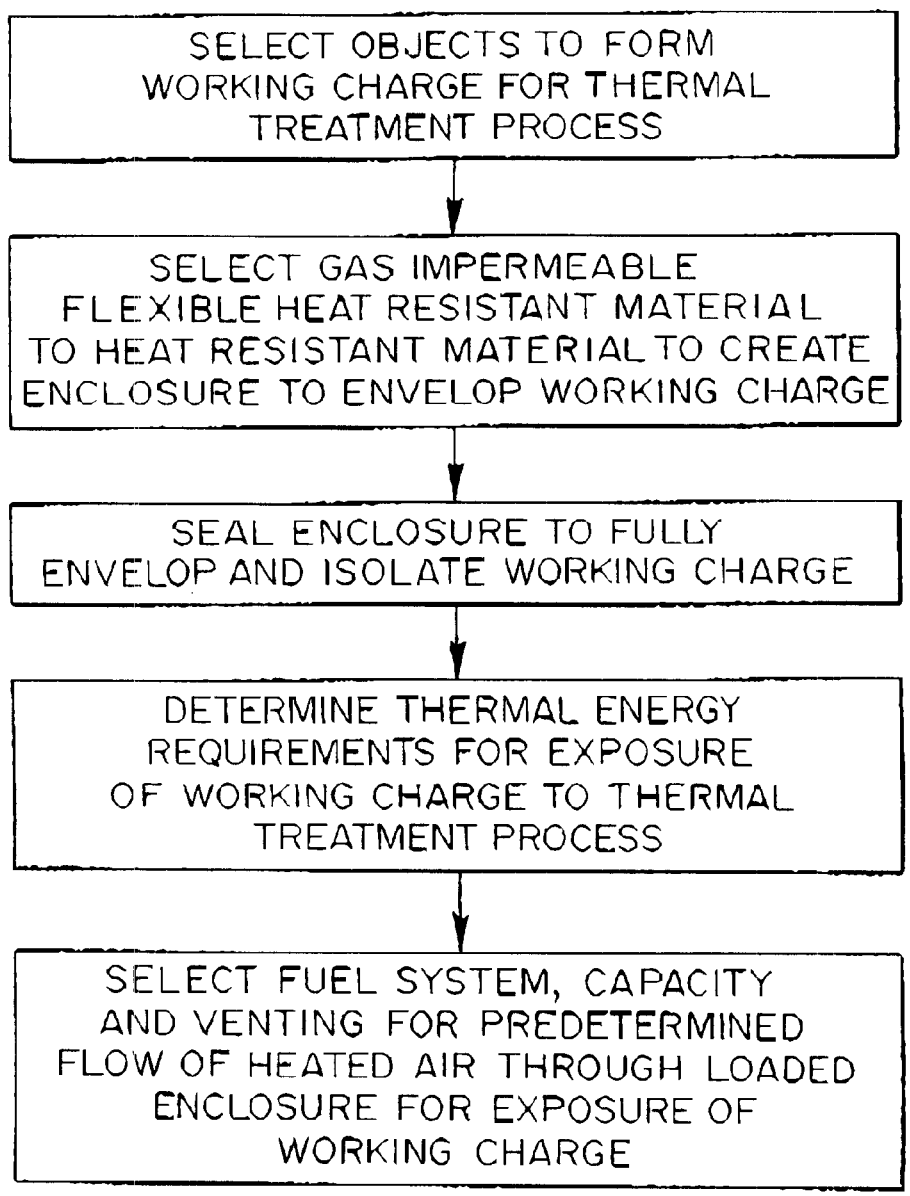
Figure 4:
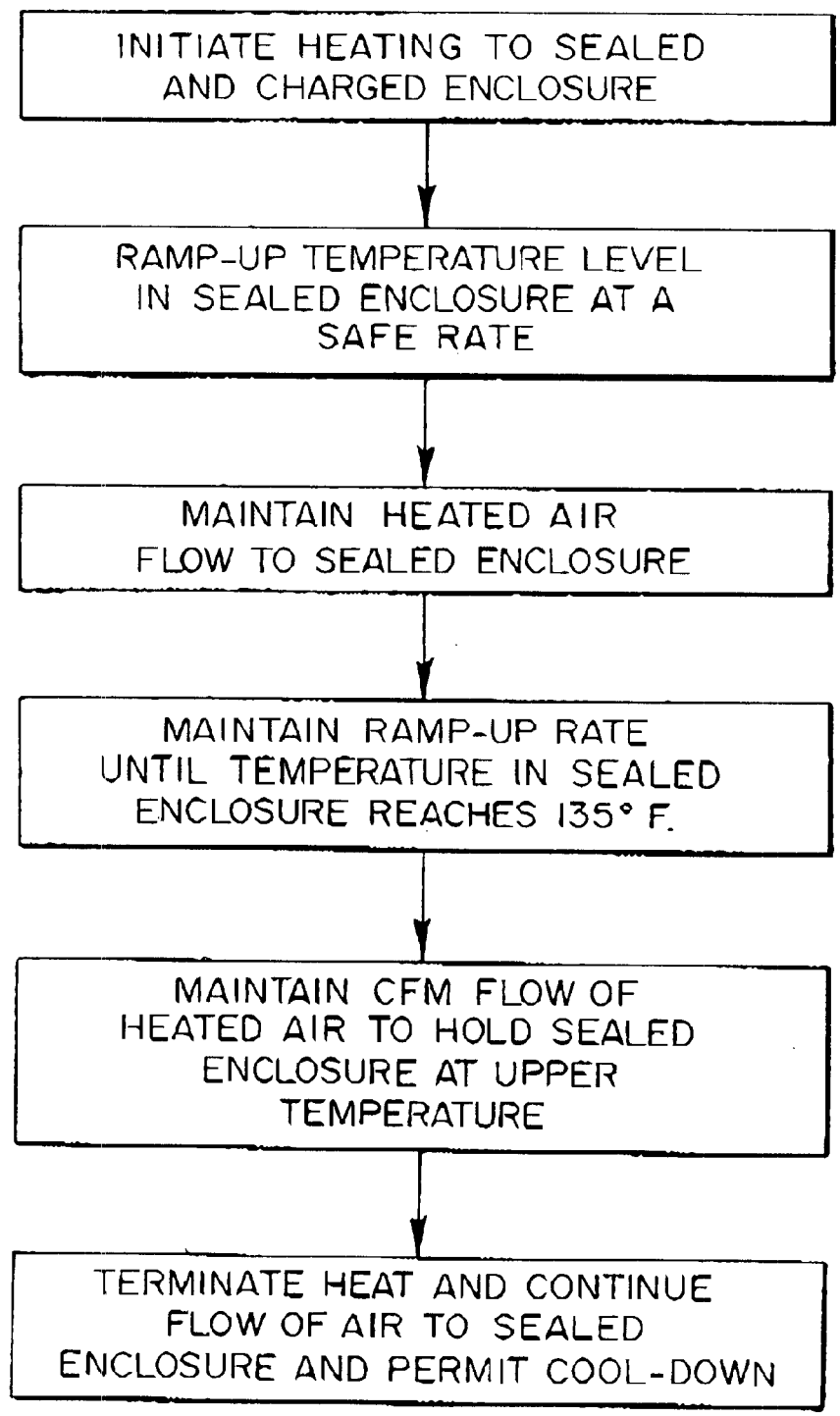

FIG. 1 is a perspective view of a typical application for the pest extermination method of the present invention, and illustrating the disposition of a working charge disposed on a flatbed trailer and overlying an impermeable flexible heat resistant material such as film or woven cloth for use in the step of creating the enclosure to envelope the working charge and flatbed trailer combination;

FIG. 2 is a side elevational view of the assembly illustrated in FIG. 1, and further illustrating the fully sealed enclosure enveloping and isolating the working charge in its supporting flatbed, and further illustrating schematically the physical arrangement of the air flow components including air flow heater including inlet and outlet ports for the enclosure, together with a heat control responsive to remotely positioned monitors positioned in or on the working charge at various points within the enclosure;

FIG. 3 is a flow chart representing the major preliminary steps involved in selecting and formulating the working charge, along with those steps involved in defining the requirements for equipment to be utilized in the treatment process; and FIG. 4 is a flow chart representing the steps involved in undertaking the actual thermal extermination process, with those steps involved in the operation being set forth.

DESCRIPTION OF THE PREFERRED EMBODIMENT

In accordance with the preferred embodiment of the present invention, the thermal treatment of a portable system for extermination of pests is undertaken as follows. The recitation of steps set forth below will enable those of skill in the art to readily and effectively practice the technique.

With attention now being directed to FIGS. 1 and 2 of the drawings, the system generally designated 10 comprises a working charge 11 which is, briefly, a wheeled portable flatbed trailer unit 12 having a palletized product load 13 thereon. The flatbed and flexible plastic film 14 are made ready for subsequent steps in the operation.

Heat resistant material or fabric 14 has edge surfaces 15 and 16 which are adapted to be releasably coupled together to form the ultimate enclosure as shown generally at 17 (FIG. 2). End surfaces such as at 14A and 14B are also provided with coupling means in order to complete the arrangement forming enclosure 17.

Flexible heat resistant material such as film or woven cloth materials are widely available, it being noted that materials suited for application in the present invention must have a temperature capability in excess of about 220° F. Such materials include, for example, certain coated polyesters, and/or heat resistant canvas, all of which are commercially available as films in woven and non-woven scrim reinforced form. One such coated polyester film is available from National Dye Works of Lynchburg, SC under the code designation "250D Polyester". This material is a fabric consisting of polyester fibers of 250×250 denier with a thread count of 54"×44 fill square inch. The material is covered with a polyurethane waterproof coating and has a flame retardant capability sufficient to pass CPA-184 specifications.

With attention now being directed to FIG. 2 of the drawings, heater/blower 13A is provided so as to deliver a constant flow of heated air to enclosure 17. Heater 13A is equipped with inlet 18 and outlet 19, with inlet 18 being open to ambience, and with outlet 19 being utilized as heat input conduit or tube 20 for enclosure 17. As further indicated in FIG. 2, exhaust ports such as at 22, 23 and 24 are provided, with these ports preferably including or comprising a damper element such as at 26 for monitoring the flow. Similar damper or other control baffles may be appropriately incorporated in exhaust vents or ports 23 and 24.

As indicated above, edges 15 and 16 are coupled together by suitable closure means. These closure means may provide an additional exhaust opening or orifice by virtue of the physical characteristics such as tightness of the joints. Such openings are indeed desirable in order to more readily control the magnitude of any superpressure within the enclosure 17. As expected, a modest superpressure is desired in order to expand enclosure 17 to an amount sufficient to permit free flow of treated air through the system.

Treatment Enclosure Defined

The dimensions, type of enclosure required, the size of the film for forming the enclosure, as well as overall size of treatment charge for heat treatment is analyzed and determined. This determination will enable the technician to establish some basic guidelines for the equipment necessary to effectively handle the procedure. Accordingly, the nature of the heat source and fuel supply is determined, along with the equipment placement factors.

The step of defining enclosure air flow is then undertaken with respect to heat movement, air distribution, placement of the working charge and desired locations for heated air inlet and exhaust. This step may generally be characterized as the determination of air flow parameters for the enclosure.

Availability and adequacy of power for the heating system being employed is then established.

As an added preliminary step, the materials or articles to be treated are analyzed and used to further determine the BTU requirements. Through this step, the specific heat loss calculations may be made in order to more specifically determine the quantity and size of equipment and air flow necessary, including heaters, fans, ductwork, and the like.

Treatment of heat resistant material or fabric to form the enclosure and equipment may then be readily determined.

Adequacy of fuel supply, either temporary or permanent, will then be determined. The requirements of the fuel supply is established by the energy available at the treatment site such as natural gas, propane, steam, electricity, or combinations thereof and the equipment being used.

The flexible heat resistant material to be utilized in forming the enclosure is equipped with suitable closure means, with typical closure means including ratcheting hold-down devices, continuous and/or spaced hook-and-loop fasteners, clasps, or the like. While it is generally desirable to provide through-flow of heated air through the enclosure, it will be readily appreciated that laterally disposed leakage zones may also be advantageously utilized, with these leakage zones providing for more uniform distribution of heat throughout the enclosure. The arrangement and disposition of monitors within the enclosure and accompanying the working charge will provide additional information regarding distribution of thermal energy within the enclosure. Such monitors will permit the proper handling and disposition of the air flow so as to avoid the creation of areas of abnormal temperature, including areas of either elevated or depressed temperatures as well as areas of stagnation. Thermal control is more easily and readily facilitated when the magnitude and velocity of air flow through the enclosure is increased.

With the equipment and enclosure in place, means are provided to provide 100% outside air to be discharged from the equipment to the treatment zone of at least 200° F. during the treating process.

The requisite air flow rate for the process is targeted at between 30 and 50 air changes per hour in the treatment zone, the zone being defined as the free air volume within the enclosure. It is desirable that no portion of the treatment zone receives less than 10 air changes per hour, with a range of up to 50 air changes per hour as indicated above being desirable. This amount of heat and air flow through the zone is necessary in order to be certain that those interior hard-to-reach zones such as product spacings and the like are effectively treated. Also, this assures a substantially even flow of heat to all areas and an even temperature pattern being achieved throughout the treatment zone. With 200° F. air flowing at the desired rate throughout the enclosure, the zone is under a positive air pressure so as to achieve maximum heat penetration in all of the areas, including areas which may otherwise be stagnant, particularly those areas adjacent the exterior wall.

Heat is provided to the outside air until a steady temperature of at least 200° F. is reached and it is then discharged at a volume rate sufficient to ramp-up the temperature within the zone at a maximum rate safe for the product but not less than about 10° F. per hour. The volume rate is selected to be sufficient to provide for between about 10 to 50 air changes per hour within the enclosure. This discharge and ramp-up rate is continued until an even air temperature throughout the product being treated at least equal to the lethal temperature for the pests is achieved. Generally, a temperature of about 120° F.–130° F. is satisfactory and constitutes an appropriate lethal temperature. The requisite temperature and air flow rate is maintained to continue providing between 30 to 50 air changes per hour, with the lethal temperature also being maintained within the treatment zone for a period sufficient to bring all of the product to a temperature of 130° F. for a period of at least ten minutes. For some more resistant pests and insects as may be found in and around food products derived from grain, the elevated temperature and air change cycles are preferably maintained for longer periods. Upon reaching the desired treatment time, the heat is turned off, and with ambient air, the flow is continued from a gradual cool-down.

In order to assist in monitoring and maintaining control of the process, a number of independent monitors are preferably mounted and/or placed within the confines of the enclosure, and also upon the working charge, either along the surface of the working charge or immersed or buried therewithin.

With attention now being directed to FIG. 2 of the drawings, a plurality of monitors such as illustrated at 35—35 are provided, with these monitors, in turn, being designed to deliver a condition-responsive signal along signal input lines 36, 37, 38 and 39. By maintaining mechanical control of the heater/blower equipment through the duration of the treatment process, care is taken to provide an adequate air flow through the system to permit the lethal temperature to be reached and experienced by the working charge for an adequate period of time.

In order to provide a further means of determining that a sufficient lethal or elevated temperature is reached, and that the lethal temperature has been achieved for a sufficient period of time, test cages may be set in place throughout the enclosure and monitoring of these test cages will normally be adequate to indicate the total effectiveness of the kill.

A preferred method, however, of determining that a sufficient lethal or elevated temperature is reached and maintained for a sufficient period of time is shown and as described in FIG. 2. Monitors 35 comprise a temperature-sensing device such as for example a thermocouple, and are positioned within the working charge such as material comprising the working load 13. The response of the temperature-sensing device or sensor is monitored to determine the actual temperature within the respective structural material at appropriate points in time.

The temperature monitoring devices 35—35 are preferably positioned within the material comprising the working charge such that a minimum temperature within any portion of the material may be measured and subsequently controlled at a desired temperature. Such positioning is critical to successful eradication of pests, in that thermal insulative properties of some materials inhibit the temperature from reaching a lethal range for the pests, even when ambient air temperatures are in the lethal range. In some embodiments of the present invention, the monitors or sensing devices 35—35 are inserted into a hole or other opening in the respective materials making up the working charge.

Through such a method, pests such as insects, mammals, reptiles, and the like may be effectively exterminated from within the enclosure. Furthermore, some non-toxic varieties of common bacteria, molds, and viruses that are vulnerable to temperatures contemplated in processes pursuant to the present invention may also be reduced and/or eliminated via such a thermal treatment method. Additionally, such a method may also be effective in accelerating respective outgassing rates of some substances located within the working charge.

It will be appreciated, of course, that various modifications may be made in the steps undertaken and defined hereinabove, without actually departing from the spirit and scope of the invention.

What is claimed is:

1. Pest extermination by thermal treatment of pest-host articles isolated within an enclosure and comprising the steps of:

(a) selecting and isolating pest-host articles to form a working charge;

(b) forming an enclosure of flexible heat resistant material about said working charge to form a loaded enclosure;

(c) sealing edges of said flexible heat resistant material to render said loaded enclosure substantially airtight;

(d) establishing an air inlet port at a preselected disposition in the wall of said enclosure and an air exhaust port in said enclosure wall at a location remote from said air inlet port;

(e) determining the air penetration parameters for said loaded enclosure;

(f) determining CFM requirements for achieving requisite air flow rate goal of between 10 and 50 air changes per hour in said loaded enclosure;

(g) introducing heated outside air into said loaded enclosure at a temperature of at least about 200° F. and at the requisite air flow rate;

(h) elevating temperature in said loaded enclosure at a ramp rate safe for said working charge until air temperature in said loaded enclosure reaches a desired level at least equal 130° F. while maintaining said requisite air flow rate; and (i) maintaining lethal temperature in said loaded enclosure for at least 10 minutes while maintaining said requisite air flow rate.

2. The pest extermination by thermal treatment of said working charge of claim 1, including a means for providing a conditioned response to the temperature within those materials comprising said working charge within the loaded enclosure.

3. The pest extermination by thermal treatment of said working charge of claim 2 wherein said conditioned response means includes:

(a) providing a plurality of temperature-sensing devices operably coupled to a thermostat;

(b) positioning said temperature-sensing devices in said working charge within the loaded enclosure; and (c) operably coupling said thermostat to an air heater, whereby said thermostat controls the heat output of said air heater such that the temperature measured by said temperature-sensing devices are maintained at said desired level.

4. The pest extermination by thermal treatment of said working charge of claim 3 wherein said temperature-sensing devices are thermocouples.

\* \* \* \* \*